United States Patent
Coccagna et al.

[15] 3,677,200
[45] July 18, 1972

[54] PALLET

[72] Inventors: Daniel T. Coccagna, 417 Jonathan Place, Philadelphia, Pa. 19115; Salah Eldin A. El Damati, 6607 Bonnie Ridge Drive Apt. No. 201, Mount Washington, Baltimore, Md. 21209

[22] Filed: Jan. 4, 1971

[21] Appl. No.: 103,455

[52] U.S. Cl. ............................................. 108/58, 108/53
[51] Int. Cl. ........................................................ B65d 19/18
[58] Field of Search ............................................. 108/51–58

[56] References Cited

UNITED STATES PATENTS

| | | |
|---|---|---|
| 2,651,486 | 9/1953 | Woodward ............................. 108/57 |
| 3,511,191 | 5/1970 | Barry, Jr. et al. ....................... 108/58 |
| 2,870,980 | 1/1959 | Higgins et al. ......................... 108/53 |
| 2,579,685 | 12/1951 | Loose ..................................... 108/53 |
| 3,149,586 | 9/1964 | Kemp, Jr. et al. ...................... 108/58 |
| 3,187,689 | 6/1965 | Hess ....................................... 108/58 |
| 3,207,095 | 9/1965 | Hiatt, Jr. ................................ 108/53 |

*Primary Examiner*—James T. McCall
*Assistant Examiner*—Glenn O. Finch
*Attorney*—Seidel, Gonda & Goldhammer

[57] ABSTRACT

A pallet formed from plastic material including means to permit four-way entry. Encircled sockets are provided on two side faces of the pallet to permit the tines of a forklift truck to engage the pallet. The other two side faces of the pallet have openings to permit the tines of a hand truck to enter and engage the pallet. The pallet is constructed and arranged to provide substantial structural strength with minimum weight and is provided with a top non-skid surface.

2 Claims, 3 Drawing Figures

Patented July 18, 1972
3,677,200
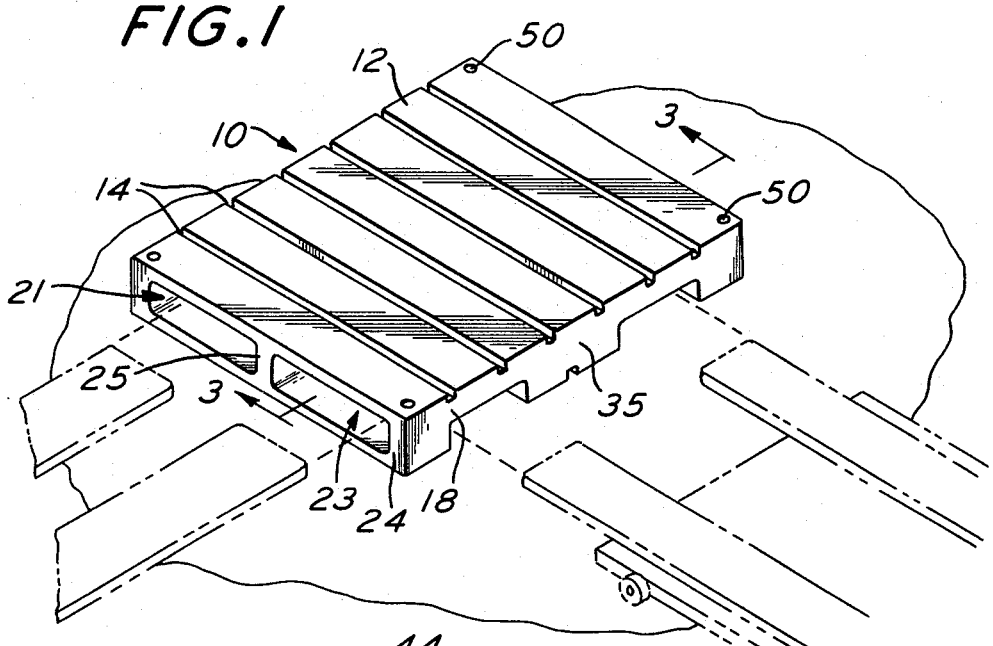
FIG. 1
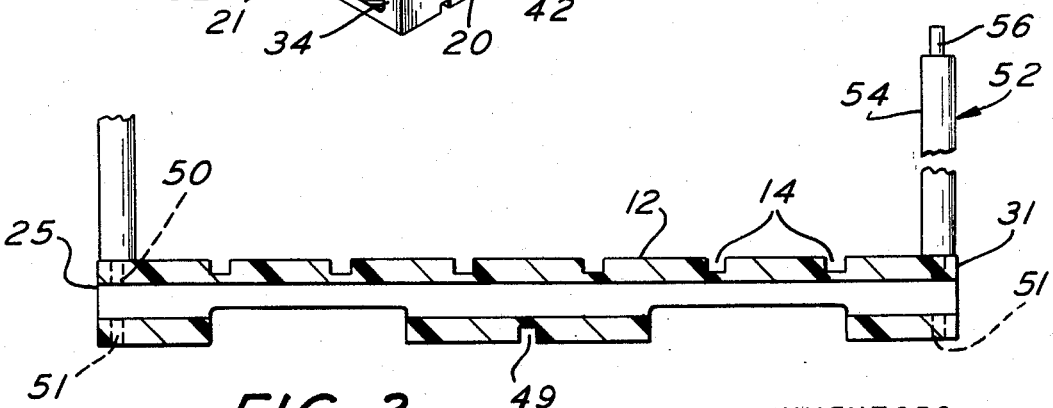
FIG. 2
FIG. 3
INVENTORS
SALAH ELDIN A. ELDAMATI
DANIEL T. COCCAGNA
BY
Seidel, Gonda & Goldhammer
ATTORNEYS

PALLET

The present invention relates to a pallet and more particularly to a pallet which can be moved by either a forklift truck or a hand truck.

Molded plastic pallets are known in the art, see, for example, U.S. Pat. Nos. 3,359,929 and 3,481,285. Also, molded thermoplastic pallets are known, see, for example, U.S. Pat. No. 3,511,191.

Various types of pellets have been suggested over the years. By far, in recent years, the most widely used pallets are constructed of wood. The ever increasing expense of wooden pallets is due not only to the cost of lumber but also to the cost of labor required to construct the pallet. While many different types of plastic pallets have been proposed, they have not met with universal acceptance. It is necessary that the pallet have substantial strength and, to achieve universality of use, it must permit four-way entry. Even pallets which permit four-way entry, to be universally accepted, should permit both the use of a forklift truck and a hand truck.

It is an object of the present invention to provide a pallet composed of plastic material which overcomes the deficiencies of prior art pallets.

It is another object of the present invention to provide a pallet which is light in weight and which can be moved by either a forklift truck or a hand truck.

It is a further object of the present invention to provide a pallet which will be attractive in appearance and relatively inexpensive to manufacture.

It is yet another object of the present invention to provide a pallet which has a non-skid top surface and which has substantial structural strength.

Other objects will appear hereinafter.

The present invention is directed to a plastic pallet which may be injection molded. A desirable pallet size according to the present invention includes a top pallet surface of approximately 42 inches × 46 inches with the height of the pallet being approximately 4½ inches. The exact dimensions of the pallet may be modified to meet specific requirements.

The top surface of the pallet may be provided with a plurality of grooves therein to both minimize weight of the pallet and provide a non-skid top surface. The pallet is provided with a center base support which extends across the entire width of the pallet. The top surface of the pallet may have three support beams formed integrally therewith which extend from the underside of the top surface. Two of the support beams preferably lie along two of the outer edges of the pallet. The third support beam is preferably intermediate the two support beams and parallel thereto.

A center base support is spaced from the underside of the top surface of the pallet and has webs interconnecting the center base support to the three support beams. The center base support extends transversely to the support beams.

The pallet further includes outer base supports lying along the other two outer edges of the pallet. The outer base supports are also transverse to the support beams and are interconnected to the support beams by interconnecting webs. The outer base supports have spaced openings therein which, in part, form encircled sockets. The sockets permit the tines of a forklift truck to enter therein and provide a relatively close fit for such tines. The encircled sockets substantially prevent twisting of the pallet as it is lifted by the tines of the forklift truck. The support beams are spaced from the bottom faces of the center and outer base supports to thereby define spaced openings at the other two outer edges of the pallet to permit the tines of a hand truck to enter therein.

Holes may be provided substantially at the corners of the pallets. The holes may be approximately 1½ inches in depth and may be adapted to receive the ends of spacers therein. Alternatively, the holes may extend completely through the pallet. The spacers may be utilized to permit pallets having uneven loads thereon to be stacked. Each spacer will be provided with reduced diameter end portions which will be received in the holes at the corners of the pallet. Each spacer will also have a heavy body portion which will insure that the spacers will support the upper pallet.

The pallet may be composed of high density polyethylene or any other suitable plastic material. The holes provided in the bottom of the pallet may be adapted to have casters inserted therein to permit the pallet to be rolled along the floor. In this manner, the pallet can be converted into a dolly.

For the purpose of illustrating the invention there is shown in the drawings a form which is presently preferred; it being understood, however, that this invention is not limited to the precise arrangements and instrumentalities shown.

FIG. 1 is a top perspective view of a pallet embodying the figures of the present invention;

FIG. 2 is a bottom perspective view of the pallet of the present invention;

FIG. 3 is a section view taken along line 3—3 of FIG. 1.

Referring now to the drawings in detail wherein like numerals indicate like elements throughout the several views, there is disclosed in FIGS. 1-3 a pallet generally indicated by reference numeral 10.

Pallet 10 includes a top substantially planar surface 12 having grooves 14 therein. The grooves 14 serve to both reduce the total weight of the pallet and also provide a non-skid surface for top surface 12.

The pallet 10 also includes a bottom face 16. The bottom face 16 has outer beams 18 and 20 integrally formed therewith. A center beam 22 is also formed integrally with bottom face 16. Center beam 22 is parallel to outer beams 18 and 20.

The pallet 10 is provided with outer base supports 24 and 26. A center base support 28 is also provided which may be approximately twice as wide as the outer base supports 24 and 26. Base supports 24, 26 and 28 are substantially parallel. Interconnecting webs 30, 32 and 34 secure the outer base support 24 to beams 18, 22 and 20, respectively. Interconnecting webs 38, 40 and 42 secure base support 26 to beams 18, 22 and 20, respectively. Interconnecting webs 44, 46 and 48 secure center base support 28 to beams 18, 22 and 20, respectively. All interconnecting webs have widths at least equal to the width of the beams so that the strength of the pallet is not impaired.

The bottom base supports 28 may have a groove 49 therein to further reduce the weight of the pallet and provide the bottom of the pallet with a non-skid surface. Alternatively, base supports 24, 26 and 28 can be provided with numerous grooves therein.

Holes 50 may be provided at the corners of the pallet 10. The holes may be provided immediately adjacent the corners of the pallet. Each of the holes should be approximately 1½ inches deep. Holes 51 should also be provided adjacent the corners in the outer base supports 24 and 26. The holes 51 in the base supports are aligned with the holes 50 in the corners of the pallet. Alternatively, the holes 50 could extend completely through the pallet 10.

Spacers 52 may be provided to permit stacking of pallets when loads on the pallets are uneven. Each spacer 52 is provided with an enlarged body portion 54 and reduced diameter end portions 56. The reduced diameter end portions 56 are adapted to be received in holes 50 and 51. The reduced diameter end portions of each spacer are adapted to be received in holes 50 in the top surface of the lowermost pallet and in the holes 51 in the base supports of the uppermost pallet to permit stacking of the pallets. The reduced diameter end portions are approximately 1½ inches in length. The body portions may be of any desired length and may be varied depending upon the height of the load on the pallet.

Outer base support 24 and webs 32, 34 and 36 cooperate with the end faces of beams 18, 22 and 20 and the bottom face 16 of the pallet 10 to form encircled sockets 21 and 23 at end face 25 of the pallet 10. Outer base support 26 and webs 38, 40 and 42 cooperate with the outer faces of beams 18, 20 and 22 and bottom face 16 to define encircled sockets 27 and 29 at end face 31 of the pallet. Outer beams 18 and 20 cooperate with base supports 24, 28 and 26 to define openings at opposite end faces 33 and 35 of the pallet.

The encircled sockets 21 and 23 or 27 and 29 are adapted to receive the tines of a forklift truck as shown in phantom line in FIG. 1. The encircled sockets will prevent twisting of the pallet as it is initially lifted from the floor. Further, the encircled sockets will serve to guide the tines of the forklift truck into engagement with the pallet.

The openings at end faces 33 and 35 of the pallet permit the tines of a hand truck to be rolled under the pallet as shown in phantom lines in FIG. 1. It is readily seen that the pallet of the present invention may be utilized with either a forklift truck or a hand truck. Further, the pallet provided by the present invention has great structural strength.

Center base support 28 may have a width which equals approximately the combined width of outer base supports 24 and 26. Each of the grooves 14 may be 1½ inches wide and approximately three-eighths inch deep. The entire height of pallet 10 may be approximately 4½ inches. Each of the openings on faces 33 and 35 of pallet 10 may be approximately 10 inches in width. Each of the socket openings on end faces 25 and 31 of pallet 10 may be approximately 20 inches in width and 3¾ inches in height.

The present invention may be embodied in other specific forms without departing from the spirit or essential attributes thereof and, accordingly, reference should be made to the appended claims, rather than to the foregoing specification as indicating the scope of the invention.

We claim:

1. A pallet comprising a load supporting member, said member having a top face and a bottom face, three support beams, each of said support beams being connected to said load supporting member at said bottom face, two of said support beams lying along opposite edges of said load supporting member, said third support beam being disposed therebetween in substantially parallel relation to said two support beams, three base supports, each of said base supports being disposed transversely of said support beams and in mutually parallel relation to each other, two of said base supports lying along opposite edges of said load supporting member, said third base support lying intermediate said first two base supports and being substantially parallel thereto, each of said base supports being spaced from said bottom face and said support beams by a plurality of webs, said webs coupling said base supports to said support beams, said pallet having spaced parallel elongated sockets for receiving the tines of a forklift truck, each of said sockets being defined by said bottom face, said support beams, said base supports and said webs, said sockets being parallel to said support beams, spaced elongated openings defined between adjacent base supports, one side of each of said openings comprising said support beams and the opposite side being open so that the tines of a hand truck can be received therein, said load support being a generally rectangular member, a plurality of spaced parallel grooves formed in said top face, said grooves being substantially equidistant from each other and providing a non-skid surface, said bottom face being continuous, said third base support being about as wide as the sum of the widths of said first two base supports, and said load supporting member, said support beams, said webs and said base supports are integrally formed from the same material.

2. A pallet as set forth in claim 1 wherein said pallet is provided with holes at the corners thereof, coaxial holes being provided in the outer base supports of said pallet to permit spacers to enter said holes to thereby facilitate stacking of pallets when uneven loads are provided on said pallet.

* * * * *